(12) United States Patent
Uy et al.

(10) Patent No.: US 7,583,203 B2
(45) Date of Patent: Sep. 1, 2009

(54) PROGRAMMING ELECTRONIC METER SETTINGS USING A BANDWIDTH LIMITED COMMUNICATIONS CHANNEL

(75) Inventors: David V. Uy, Raleigh, NC (US); Andrew J. Borleske, Garner, NC (US)

(73) Assignee: Elster Electricity, LLC, Raleigh, NC (US)

( * ) Notice: Subject to any disclaimer, the term of this patent is extended or adjusted under 35 U.S.C. 154(b) by 739 days.

(21) Appl. No.: 11/287,806

(22) Filed: Nov. 28, 2005

(65) Prior Publication Data

US 2007/0124262 A1 May 31, 2007

(51) Int. Cl.
*G08B 23/00* (2006.01)
(52) U.S. Cl. .................. 340/870.02; 370/473; 370/474; 709/215
(58) Field of Classification Search .................. 370/473, 370/474, 312; 709/215; 340/870.02
See application file for complete search history.

(56) References Cited

U.S. PATENT DOCUMENTS

| | | | |
|---|---|---|---|
| 5,696,765 A | 12/1997 | Safadi | |
| 6,486,652 B1 | 11/2002 | Ouellette et al. | 324/142 |
| 6,538,577 B1 | 3/2003 | Ehrke et al. | 340/870.02 |
| 6,657,552 B2 | 12/2003 | Belski et al. | 340/870.02 |
| 6,778,099 B1 | 8/2004 | Meyer et al. | 340/870.02 |
| 6,813,571 B2 | 11/2004 | Lightbody et al. | 702/62 |
| 6,891,838 B1 | 5/2005 | Petite et al. | 370/401 |
| 2002/0147503 A1 | 10/2002 | Osburn, III | 700/9 |
| 2003/0001754 A1 | 1/2003 | Johnson et al. | 340/870.02 |
| 2003/0015447 A1 | 1/2003 | Huang | 206/376 |
| 2004/0114737 A1 | 6/2004 | Macconnell | |
| 2005/0036387 A1* | 2/2005 | Seal et al. | 365/222 |
| 2005/0240540 A1* | 10/2005 | Borleske et al. | 705/401 |
| 2006/0079254 A1* | 4/2006 | Hogan | 455/466 |
| 2006/0085147 A1* | 4/2006 | Cornwall et al. | 702/62 |
| 2006/0241882 A1* | 10/2006 | Cornwall et al. | 702/62 |

FOREIGN PATENT DOCUMENTS

WO   WO 2005/033964   4/2005
WO   WO 2005/106751 A2   11/2005

OTHER PUBLICATIONS

Weller, "A Case Review of Technical and Technological Issues for Transition of a Utility Load Management Program to Provide System Reliability Resources in Restructured Electricity Markets", Jul. 2001, Ernest Orlando Lawrence Berkeley National Laboratory, http://certs.1bl.gov.

* cited by examiner

*Primary Examiner*—Timothy Edwards, Jr.
(74) *Attorney, Agent, or Firm*—Woodcock Washburn LLP

(57) ABSTRACT

A system for transferring a sequence of actions to an electronic meter through a bandwidth limited communications channel. The sequence of actions is programmed as a program file that is broken into pieces for transmission to the electronic meter. The pieces are received by the electronic meter, verified not to contain errors, and combined into a single program session. Any errors in the transmission are noted in a status table and the program file is retransmitted. Upon receipt of an execute command, the program session is commenced. After the session has completed the status table is updated. Thus, the electronic meter may be programmed in a programming session that contains more data than can be transferred via the bandwidth limited communications channel.

13 Claims, 5 Drawing Sheets

PROGRAMMING ELECTRONIC METER SETTINGS USING A BANDWIDTH LIMITED COMMUNICATIONS CHANNEL

FIELD OF THE INVENTION

The present invention relates to programming a remote device via a communications network. In particular, the present invention is directed to a system for transferring a sequence of actions to a node such that the sequence can be executed in a single session at the node, where the communications channel does not provide enough bandwidth to transmit the sequence at one time.

BACKGROUND OF THE INVENTION

Automated means for collecting meter data typically involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902-928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. In addition, other information is transmitted to and from the meters, such as configuration and programming information. The network bandwidth over which this data and information is communicated is often limited. Thus, the data and information may be broken into chunks. A problem with this is that the data and information needs to be verified as meter operation and billing data may be greatly affected by inaccuracies. Another problem is that meter settings often need to be committed in a single programming session. Breaking data into chunks does not allow for all settings to be communicated in a single session.

Thus, while existing fixed wireless systems have reduced the need for human involvement in the daily collection of meter data and information, there is a need to improve upon how data is communicated in the fixed wireless systems.

SUMMARY OF THE INVENTION

A system for transferring a sequence of actions to an electronic meter through a bandwidth limited communications channel. The sequence of actions is programmed as a program file that is broken into pieces for transmission to the electronic meter. The pieces are received by the electronic meter, verified not to contain errors, and combined into a single program session. Any errors in the transmission are noted in a status table and the program file is retransmitted. Upon receipt of an execute command, the program session is commenced. After the session has completed the status table is updated. Thus, the electronic meter may be programmed in a programming session that contains more data than can be transferred via the bandwidth limited communications channel.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for communicating data, information, settings through a bandwidth limited channel are described below with reference to FIGS. 1-5. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter becomes registered with the collector that can provide a communication path to the meter. The collectors receive and compile metering data from a plurality of meter devices via wireless communications. A communications server communicates with the collectors to retrieve the compiled meter data and to send information (e.g., settings, configuration data, executable instructions, etc.) back to the meters.

Figure 1:
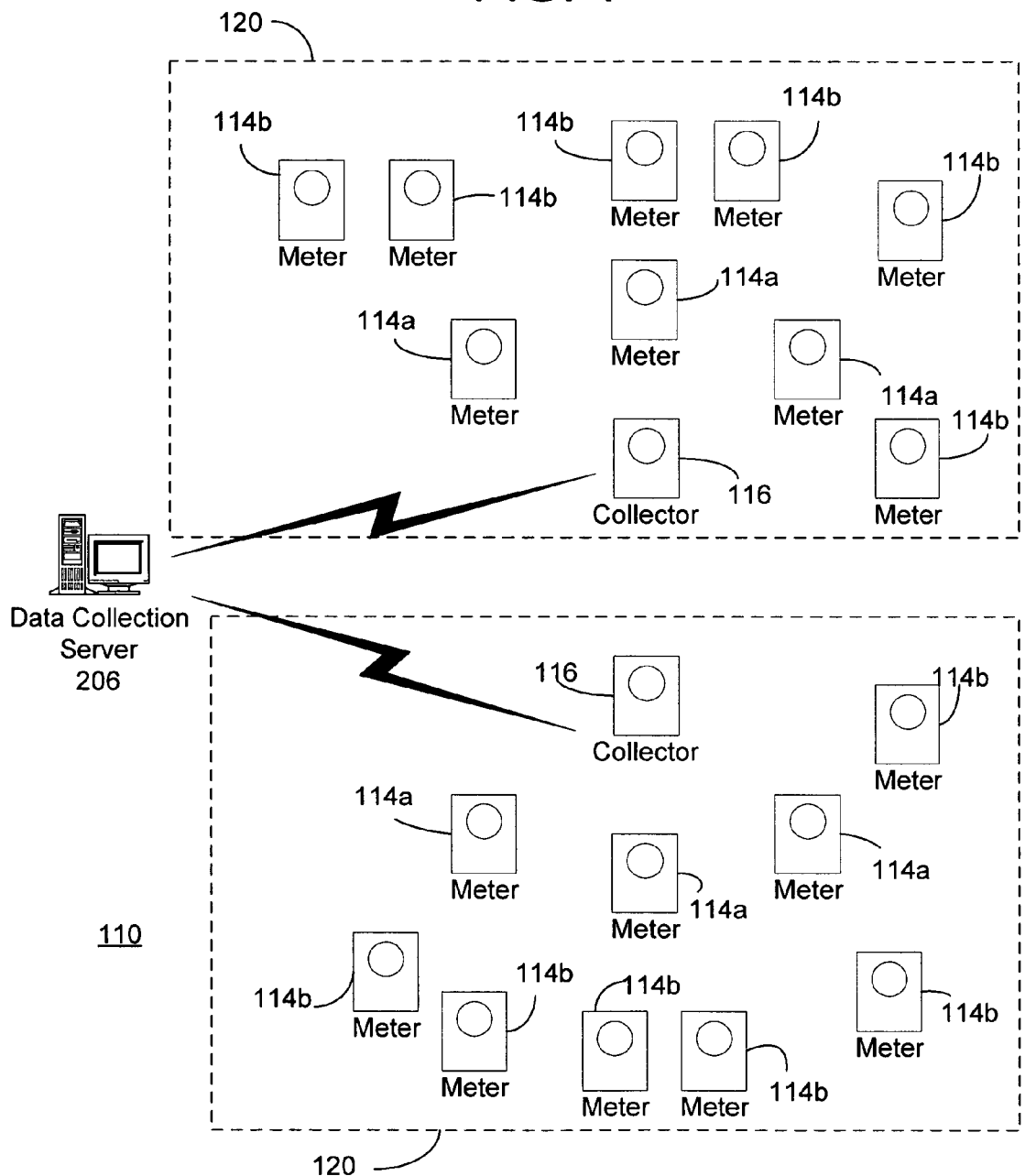
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by Elster Electricity, LLC.

A collector 116 and the meters 114 for which it is configured to receive meter data define a subnet/LAN 120 of system 110. As used herein, meters 114 and collectors 116 maybe considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with the collector 116, whereas the meters 114b are higher level meters that communicate with other meters in the network that forward information to the collector 116. As noted above, there may be bandwidth constraints on the wireless communication link between the collector and the meters 114.

Figure 2:
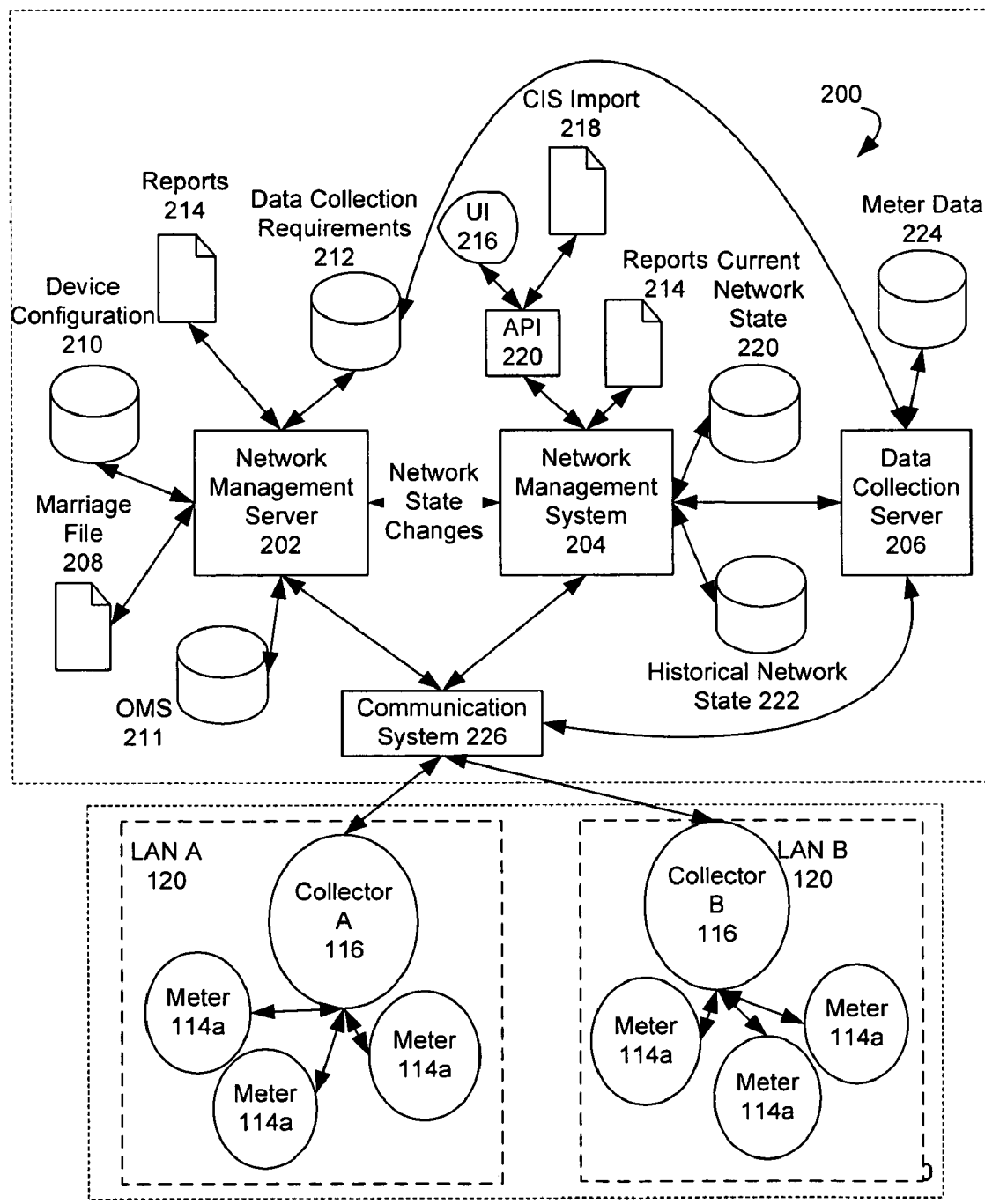
FIG. 2 expands upon the diagram of FIG. 1 and illustrates a system in which the present invention is embodied.

Referring now to FIG. 2, there is illustrated a system 200 in which the present invention may be embodied. The system 200 includes a network management server 202, a network management system (NMS) 204 and a data collection server 206 that together manage one or more subnets/LANs 120 and their constituent nodes. The NMS 204 tracks changes in network state, such as new nodes registering/unregistering with the system 200, node communication paths changing, etc. This information is collected for each subnet/LAN 120 and are detected and forwarded to the network management server 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number, a manufacturer serial number and LAN ID for each node (e.g., meters 114a and collectors 116) in the subnet/LAN 120. A device configuration database 210 stores configuration information regarding the nodes. For example, in the metering system 110, the device configuration database may include data regarding time of use (TOU) switchpoints, etc. for the meters 114a and collectors 116 communicating to the system 200. A data collection requirements database 212 contains information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

Figure 3:
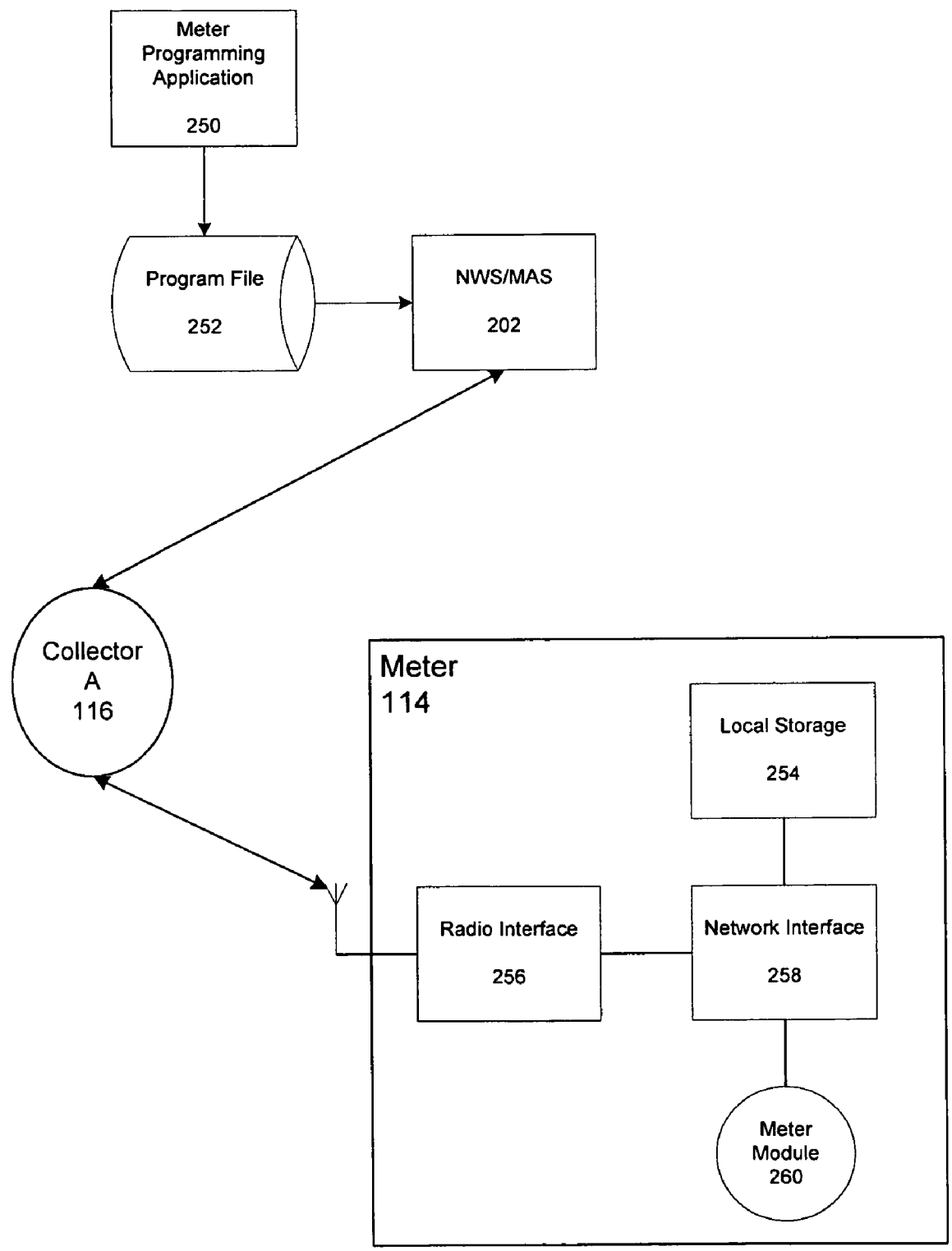
FIG. 3 illustrates components for communicating information, such a settings, to a meter.

Referring to FIG. 3, there is shown a meter 114 in greater detail. A metering module 260 is connected to the wireless network though an intelligent communication interface card 258. The network may be a spread spectrum ISM (900 MHz) band radio having limited bandwidth and the meter may communicate using a radio interface 256. The metering module 260 may have several kilobytes of table information that is to be written as a continuous block in order to prevent incorrect operation of the meter 114. The table information includes settings and configuration information related to the operation of the meter. In addition, table writes may also need to be done along with function executions. Given the requirements and the speed of the channel, the metering module 260 works in conjunction with an intelligent communications network controller in the collector 116 and local storage 254 to distribute the entire process dialog, verify delivery, store the table information and function executions, and commit the dialog to the module 260.

In practice, an end-user builds a programmed sequence of table writes and function executions 252 using, e.g., a meter programming application 250 on a PC computer. The program file 252 is passed to the network management server 202 and then sent through a high-speed or modem communications network to a network controller device within, e.g., collector 116 and stored in memory on that device. The program would be accompanied by a list of network nodes (meters 114) requiring the delivery of the program. The network controller breaks the large amount of information into small enough pieces to fit within the bandwidth limited network. By writing the small pieces in sequence, the controller can guarantee accurate delivery of the message. Sequence numbers can be added to the message to provide additional assurance that the messages are reassembled in the correct order. In addition, each message sent through the network is protected by error detection by a CRC and utilizes acknowledgement of receipt.

When all the pieces have been received by the intelligent communications card 258, the network controller issues a network command to commit the memory buffer contents to the metering module 260 in a single communications session. The intelligent communications card 258 processes each command or transaction and records the results, while monitoring for failures. Upon successful completion of the session, the intelligent communication card 258 records the status in a status table for the network controller to read and report back to the user.

If one of the table or command functions within a session should fail, the intelligent card 258 aborts the process and reports the error back through the status table. An error condition may have the potential to render the metering module 260 useless unless care is taken to construct and test a program before distributing it over this system. To reduce the impact that bad or incorrect table data may cause on the metering module 260, pending tables, with a scheduled application date, may be used.

Figure 4:
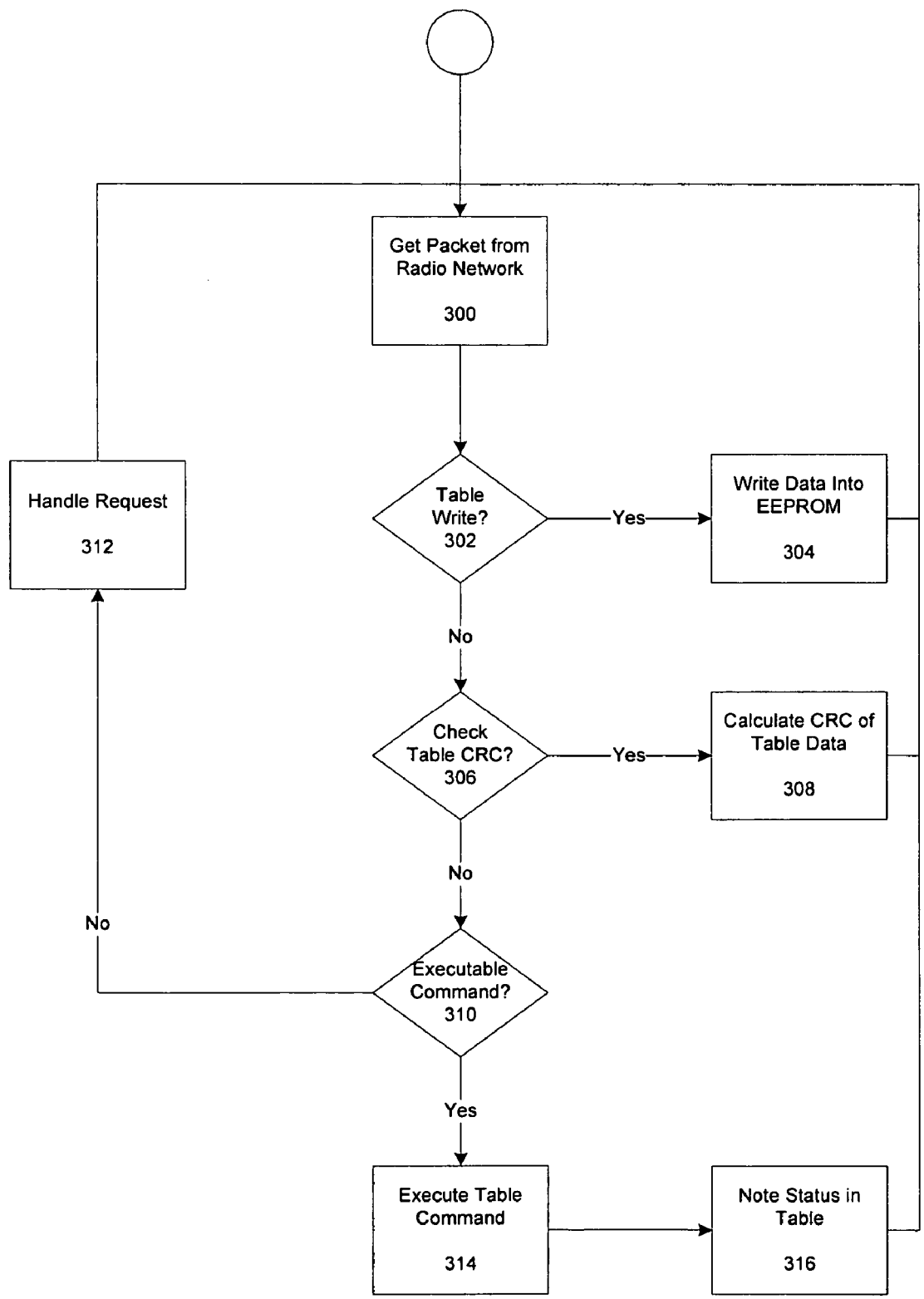
FIG. 4 illustrates a flowchart of exemplary meter module and radio interface logic.

FIG. 4 illustrates a flowchart of exemplary meter module and radio interface logic. The processes begin by receiving a packet from the radio network (step 300). The network interface 258 determines if the packet contains an instruction for a table write at step 302, and if so, writes the data into an EEPROM on the meter 114 (step 304). If not, then the network interface 258 determines if the packet contains an instruction to check a table CRC (step 306). If so, the CRC is calculated (step 308) to confirm the table contains error-free data. If not, then the network interface 258 determines if the packet contains an executable instruction (step 310). If so, the command is executed (step 314) and a status is noted in the status table (step 316). If not, then it may be assumed at step 310 that another type of request has been made, which is handled at step 312. The process begins again with the next packet.

Figure 5:
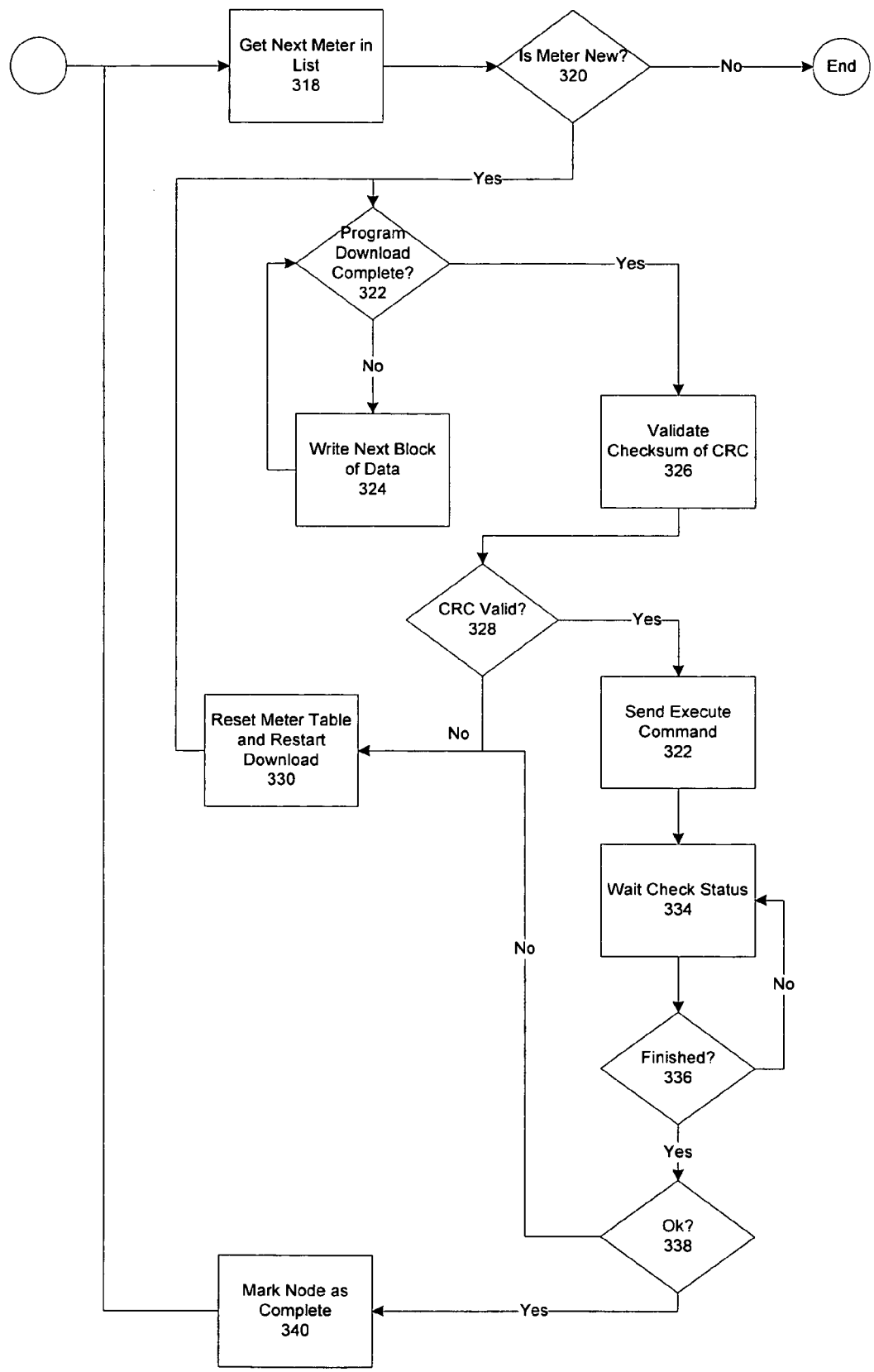
FIG. 5 illustrates a flowchart of exemplary radio network controller and interface logic.

FIG. 5 illustrates a flowchart of exemplary radio network controller and interface logic that is run at, e.g., a collector 116. The next meter in a list of nodes to be updated is retrieved (step 318). Next, it is determined if a meter is new (step 320). If not, then the processing ends. If so, then it is determined if a program download to the meter is complete (step 322). If not, a next block of data is communicated to the meter to be written (step 324). If the program download is complete, then the data is checked to determine if there are any errors by validating a checksum of the CRC (steps 326, 328). If the CRC is not valid, the meter table is reset and the download is restarted (step 330). The download may occur immediately or a time determined by the collector.

If the CRC is valid, then an execute command is communicated (step 322) and the collector 116 waits to check a status (step 334). Next, it is determined if the node is finished executing the command (step 336). If the node is finished, then it is determined if the command was properly executed from the status table (step 338). If the node finished properly, then the node is marked as complete (step 340) and the next node is retrieved from the list (step 318). If the node did not finish properly, then the meter table is reset and the download is restarted (step 330). Here again, the download may occur immediately or a time determined by the collector.

Exemplary Implementation

A sequence of table reads and writes constituting a Time of Use schedule programming may be created off-line using a configuration and programming tool 250 called MeterCat, available from Elster Electricity LLC, Raleigh, N.C. The resulting output 252 of this configuration tool is a sequence of packets that are transmitted as if a normal dialog were carried out with the meter without error, excluding the start, identify, negotiate and logon portions of the dialog which will be added by the communications card when actually dialoging the meter. As an example, below is the dialog required for a pending TOW calendar program:

Table Write PST54
Table Write MT08 (programming audit entries)
Execute function SF11 (health)
Table Read MT03 (to verify acceptability of table)
Table Read ST55 (to verify date arid time)
Table Write MT08 (programming audit entries)

The resulting set of transmitted information is transferred as a complete block to the network gateway software where it is assigned a specific identification number and a given a list of meters 114 (nodes) to which it will be distributed. The distribution list and the block of information is then transferred over modem or other WAN to the network controller device (collector 116), where it is stored in non-volatile memory. Another command available through this mechanism is a Write Fill Byte command. When specified, this instruction will cause a table to be filled with a specific fill byte. This command is used for clearing an entire table without wiling the whole table through this mechanism.

At a time designated by the network management server 202, the controller 116 will begin transferring the block of information to the list of nodes. The controller will transfer up to 38 bytes of data at a time through the FHSS radio network and confirms the delivery of each piece of data at the destination. If a packet receipt is not acknowledged, the collector 116 will rescheduling the sending of the same block again try a different time and reattempt. When the whole block of data is successfully transferred to the destination node, it is marked for execution. The message to execute the block is sent separately by the network controller. When a node receives the message to execute, it will confirm the block of data in memory 254 is valid using a CRC that is written with the block. It will also parse through all the data to confirm that fundamentally all the C12 application layer commands are valid.

If no errors are found in pre-processing then execution is commenced by wrapping the block data with the following preamble:
Identify
Negotiate
Logon
<block of data>

And the block of data is followed by the following dialog
Logoff
Terminate

The success of this process requires the radio network interface card 256 to have information about the password to successfully initiate the logon process. A block data is parsed by the intelligent communications card 258 and the queries are sent one at a time. The block data queries are reduced to their fundamental C12.18 application layer queries and are parsed as such. Responses are stored in a separate memory area and contain reference information to the block command generating the response and any response data that is returned by the meter 114 as a result of the query.

Any errors that occur during this process are also logged in the response block and the last error is logged in a status table that can be easily read through the radio network by the network controller. Once enough time is allowed to execute a block, the network controller 258 will read the status table and verify if the block of data has been programmed properly or if any errors have occurred as a result. Errors are maintained in the status table for the end user to download and view when they check for status.

The controller in the collector 116 will collect as part of is follow-up a read of the status table. It will keep this data ready for the end-user to check on the status of the schedule delivery to the meters in the field. The user can verify that the meters have been properly programmed and can take corrective action should a program fail to be delivered to the meter. Information provided in the status table may include, but is not limited to:

Number of C12 application layer commands (as determined by pre-parsing the block of data)

The current command number being executed (if the programming session is currently active)

The current procedure D (if the programming session is currently active)

The current table ID (if the programming session is currently active)

A bit indicator to show if the programming session is active or not)

Instead of sending an execution request, the controller may send a verification request which will count the number of application layer requests and validate the CRC of the command block. Other commands may be sent to the meters 114 to obtain status information.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A system for communicating data to a electronic meter over a bandwidth limited network, comprising:
    a controller having a network scheduler;
    a radio interface at said electronic meter that receives said data from said controller; and
    a network interface at said electronic meter that processes said data,
    wherein said controller communicates said data in pieces to said electronic meter and reads a status table in said electronic meter to verify that said complete block of data has been programmed properly or if any errors occurred, wherein said network interface stores each piece in memory such that the pieces are combined in a memory buffer to be executed together within said electronic meter, and wherein said network interface determines if a command to execute has been received.

2. The system of claim 1, wherein each piece is processed to determine the existence of errors.

3. The system of claim 2, wherein an acknowledgment is returned from said electronic meter to said controller to acknowledge receipt of each piece.

4. The system of claim 1, wherein said pieces contained in said memory buffer are committed in a session to program said electronic meter.

5. The system of claim 4, wherein the results of said session are recorded in the status table to be read by said controller.

6. A method of receiving information over a bandwidth limited network at an electronic meter, comprising:
    (a) receiving a portion of a block of information;
    (b) acknowledging receipt of said portion of said block of information;
    (c) storing said portion of said block of information in memory;
    repeating steps (a) through (c) until a whole block of data is received;
    determining if any errors are contained in said whole data block; and
    parsing said whole data block in response to a received command to determine if C12 application layer commands are valid.

7. The method of claim 6, further comprising determining errors by referencing a CRC that is written with said whole data block.

8. The method of claim 6, further comprising determining errors by checking sequence numbers of individual messages to ensure that the messages are assembled in the correct order.

9. The method of claim 6, further comprising:
    querying said electronic meter; and
    storing responses to queries.

10. A method of sending information over a bandwidth limited network to remotely located electronic meters, comprising:
    selecting a target electronic meter;
    sending a portion of a complete block of data to said target electronic meter;
    sending subsequent portions of said complete block of data to said target electronic meter;
    sending an execute command when said complete block of data has been transferred to said target electronic meter; and
    reading a status table in said target electronic meter to verify that said complete block of data has been programmed properly or if any errors occurred.

11. The method of claim 10, further comprising restarting the sending of said complete block of data if errors occurred.

12. The method of claim 10, further comprising marking said electronic meter as complete if said complete block of data has been programmed properly.

13. The method of claim 10, further comprising, performing said method at a collector in a wireless mesh network.

* * * * *

UNITED STATES PATENT AND TRADEMARK OFFICE
CERTIFICATE OF CORRECTION

PATENT NO.       : 7,583,203 B2
APPLICATION NO.  : 11/287806
DATED            : September 1, 2009
INVENTOR(S)      : Uy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Fourteenth Day of September, 2010

David J. Kappos
*Director of the United States Patent and Trademark Office*